United States Patent [19]

Cappotto et al.

[11] 3,996,812

[45] Dec. 14, 1976

[54] PULLEY

[75] Inventors: Samuel D. Cappotto, Syracuse; John E. Dodge, Cortland, both of N.Y.

[73] Assignee: SCM Corporation, New York, N.Y.

[22] Filed: Oct. 20, 1975

[21] Appl. No.: 623,690

[52] U.S. Cl. .............................. 74/231 C; 74/229; 74/243 R

[51] Int. Cl.² .................... F16G 1/28; F16H 7/00; F16H 55/30

[58] Field of Search ......... 74/231 C, 231 R, 243 R, 74/243 F, 229

[56] References Cited

UNITED STATES PATENTS

| | | | |
|---|---|---|---|
| 2,753,980 | 7/1956 | Ballard | 74/243 R X |
| 2,987,932 | 6/1961 | Szonn | 74/229 |
| 3,083,583 | 4/1963 | Szonn | 74/229 |
| 3,472,563 | 10/1969 | Irgens | 74/231 C X |
| 3,597,985 | 8/1971 | Jeffrey | 74/229 |
| 3,744,330 | 7/1973 | Sugimoto | 74/231 C X |

*Primary Examiner*—Leonard H. Gerin
*Attorney, Agent, or Firm*—Stanley J. Klem; Ernest F. Weinberger; Milton M. Wolson

[57] ABSTRACT

A pulley for a high speed positive drive system for business machines. The uppermost contour of the teeth of the pulley in combination with the contour of the valleys therebetween, when functionally engaged by a standard positive drive timing belt, provides a quiet running power transmission drive system.

36 Claims, 3 Drawing Figures

PULLEY

BACKGROUND OF THE INVENTION

The present invention relates to power transmission noise suppression for high speed positive drive pulley and belt systems and in particular to a pulley design for business machines.

Positive drives as referred to in this disclosure include all flexible drive belts having a plurality of equally spaced teeth that engage a pulley that has a plurality of corresponding equally spaced teeth to transmit power from a power source to a driven device with minimum slippage and preferably little noise between the belt and the pulley.

Positive drive pulley and belt systems in the past that operated at high speed usually generated objectionable noise to the surrounding environment. The origin of the noise was a combination of factors; namely, the high rotational speed and the small motor pulley diameter that was necessary to obtain the desired speed ratios, and the initial contact of the belt teeth with the pulley teeth.

Although business machines in general are subject to noise generated by high speed positive drive systems, typewriters have been selected for purposes of emphasizing the effect of noise in a quiet office area.

With the advent of portable electric typewriters, most of which are used in quiet environments, noise became increasingly more noticeable and disturbing. The efficiency of persons who require concentration or uninterrupted conversation with others has been known to be adversely affected by extraneous sounds. Cognizant of the desire for greater noise suppression in such equipment, typewriter manufacturers have implemented costly noise research programs to reduce the noise emission from the typewriter and in particular, the drive system of the typewriter.

Improvements to reduce the noise emission from the typewriter have been made over the years, but none has ever met with complete pubic acceptance. Efforts to reduce the sound vibrations initiated by the drive systems of all business machines have been made over a long period of time.

For example, U.S. Pat. No. 2,987,932 to R. E. Szonn teaches a combination belt and gear (pulley) made of elastic material. The novelty lies in the tooth space angle of the gear in relation to the tooth or teeth of the belt when they are in mesh to be greater than the included tooth angle of the belt. Therefore, the upper portions of the belt progressively deform within the voids between the belt tooth and the tooth space of the gear when meshing with the gear to absorb the shock forces resulting in less vibration and less noise. The tooth space angle being the angle formed by opposing faces which define the gear tooth space and the tooth angle of the belt being the angle formed by respective faces of the belt tooth.

Another example of an approach to reducing the noise generated by a belt and pulley drive system is disclosed in U.S. Pat. No. 2,988,925 granted to H. C. Sauer. The patent relates to a positive drive belt with teeth having transverse grooves therein to reduce wear and noise during operation. The grooves in the belt teeth render the flanks of the individual teeth more flexible and resilient. Therefore, as the belt teeth mesh with the teeth of a pulley, the belt tooth flanks yield, thereby adapting more flexibly as they mesh with the pulley teeth, resulting in a less noise power transmission drive system. Both patents mentioned above relate to special belts having a specially designed tooth configuration.

The present invention depends entirely on the contour of the teeth and valleys therebetween, used in conjunction with a standard tooth drive belt to transmit power from one location to another without slippage between the pulley and the belt.

For the purpose of clarity, the term "valleys", as used in this disclosure, includes the distance from the base of one tooth to the base of an adjacent tooth excluding the opposing faces thereof.

The manufacture of toothed drive belts is a complex molding procedure. In order to give the belt the necessary strength and elasticity to perform without failure over long periods of time a variety of combinations of construction materials are required. Equally important as the combination of materials used in the belt construction, is the expertise of the personnel responsible for the molding process. In other words, the success or failure of the molded belt during operation depends largely on the molding knowledge of the mold operator at the time of manufacture. Furthermore, as various new combinations of materials are used to meet more stringent requirements such as wear and flexibility, it is often necessary to alter the molding techniques in order that the various materials be properly bonded together to achieve these requirements. It is situations such as this that the expertise of the mold operator is paramount.

Additionally, if the materials are not compatible during the process bonding, the mold operator, utilizing his years of experience in molding techniques, will be able to ascertain what appropriate adjustments to the molding process are required to insure proper material bonding compatibility. It can be seen from the foregoing that the molding of power transmission drive belts is an imperfect art at best. The success in the molding process in the manufacture of power transmission belts is determined by many criteria, all of which, when combined, result in the manufacture of a reliable and long-wearing belt. These criteria may include environmental temperature and humidity, mold temperature parameters, molding time, construction materials, and above all operator expertise.

In contrast, the molding or casting of pulleys require an expertise to a much lesser degree and having greater manufacturing tolerance parameters. For example, the materials used in the manufacture of pulleys are generally pre-formulated and require no additional care other than insertion into the molds after preheating. Elasticity is not usually a required characteristic and therefore the pulleys are dimensionally stable.

The present invention possesses advantages not available in the prior art in that standard positive drive belts may be utilized with the disclosed pulley embodiment resulting in quieter power transmission with no sacrifice in cost.

Positive drive concepts in the prior art usually rely on a special belt tooth design to reduce noise. This approach to the noise problem is significantly more costly and generally less successful than the special pulley tooth contour of the present invention.

SUMMARY OF THE INVENTION

According to the illustrated embodiment there is provided a pulley for high speed positive power transmission drives having an outer peripheral surface comprised of contoured projecting teeth with contoured valleys therebetween. The crest of the teeth are unidirectionally sloped whereby the teeth of a conventional positive drive power transmission belt in mesh with the contoured teeth of the pulley and contoured valleys therebetween produce a quiet high-speed positive drive system for typewriters.

The term "conventional positive drive transmission belt" as used in this disclosure includes an endless flexible power transmission belt having spaced teeth projecting therefrom. The teeth generally include a flat crest with opposing tooth faces depending therefrom and terminating in a flat valley therebetween.

Accordingly, an object of the present invention is to provide a pulley where only a single pulley tooth drivingly engages a single tooth of a conventional belt at any given time.

Another object of the present invention is to provide a quiet high-speed power transmission drive system for typewriters.

Another object of the present inventon is to provide a pulley where, in combination with a drive belt, a rolling engagement therebetween is obtained.

A further object of the present invention is to provide a pulley whereby the contact between the pulley teeth and the belt teeth is reduced to a minimum.

Another object of the present invention is to provide a pulley whereby the contact between the belt teeth and the valleys between the pulley teeth is reduced to a minimum.

A still further object of the present invention is to provide a pulley whereby the angular rotation from the support of one tooth to the next is at a minimum.

A still further object of the present invention is to provide a pulley that can be used with any matched standard positive drive belt.

Other objects, features, and advantages of the invention will become more apparent from the following description, appended claims, and accompanying drawing.

DESCRIPTION OF THE PREFERRED EMBODIMENT

Figure 1:
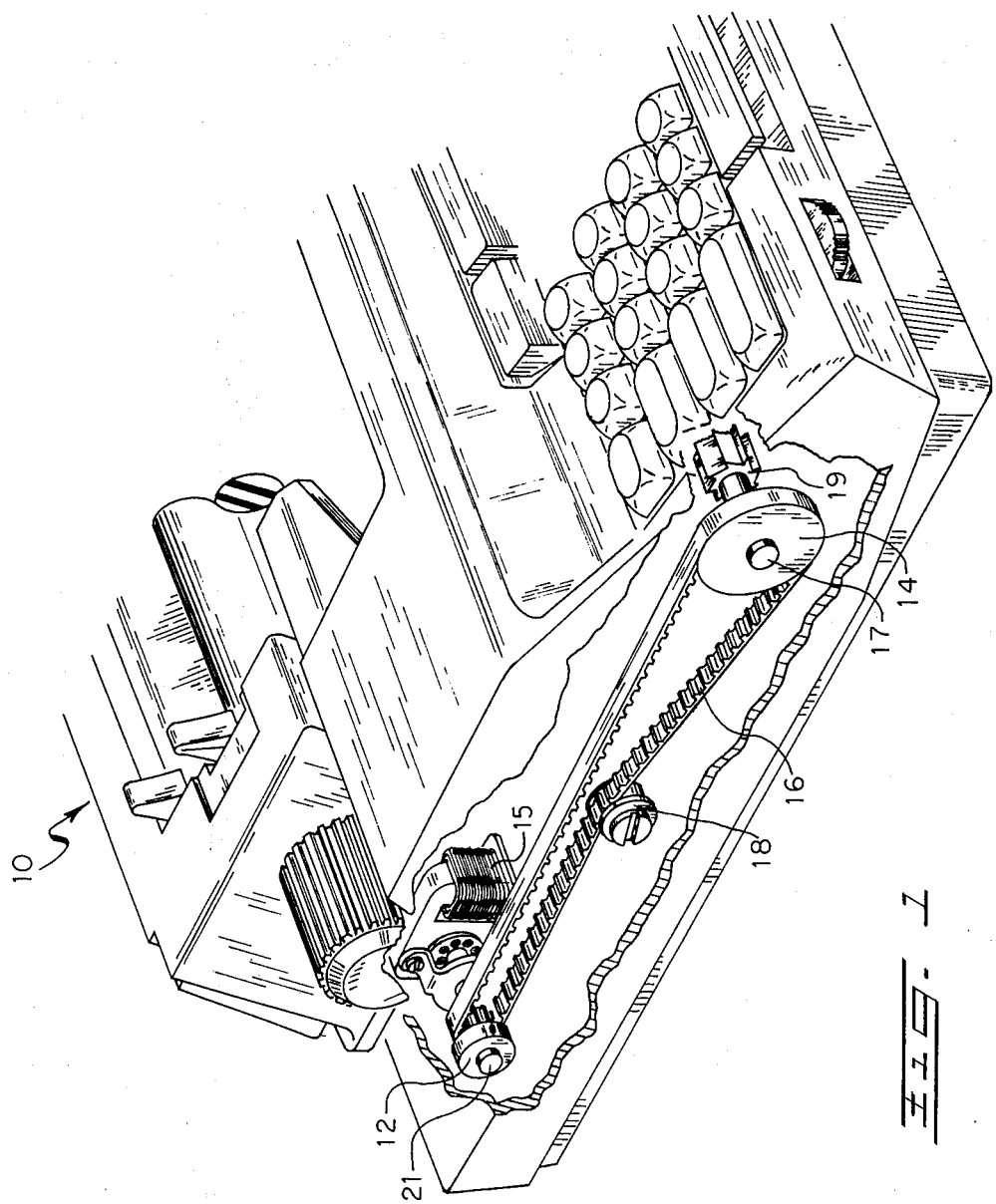
FIG. 1 is a perspective view of a portion of a typewriter with the pulley made in accordance with the present invention.

Referring now to FIG. 1, there is shown a part of a typewriter 10 with a tooth drive pulley 12, a toothed driven pulley 14 and a conventional power transmission drive belt 16 supported therebetween. Intermediate pulley 12 and pulley 14 is a belt takeup pulley 18. Pulley 12 is fixed to a drive shaft 20 of a drive motor 15 and is urged to rotate counterclockwise. Belt 16 is driven by pulley 12 which in turn rotates pulley 14 counterclockwise. Pulley 14 is fixed to an end 17 of a power roll 19 which provides the driving power to the various typewriter instrumentalities.

Figure 2:
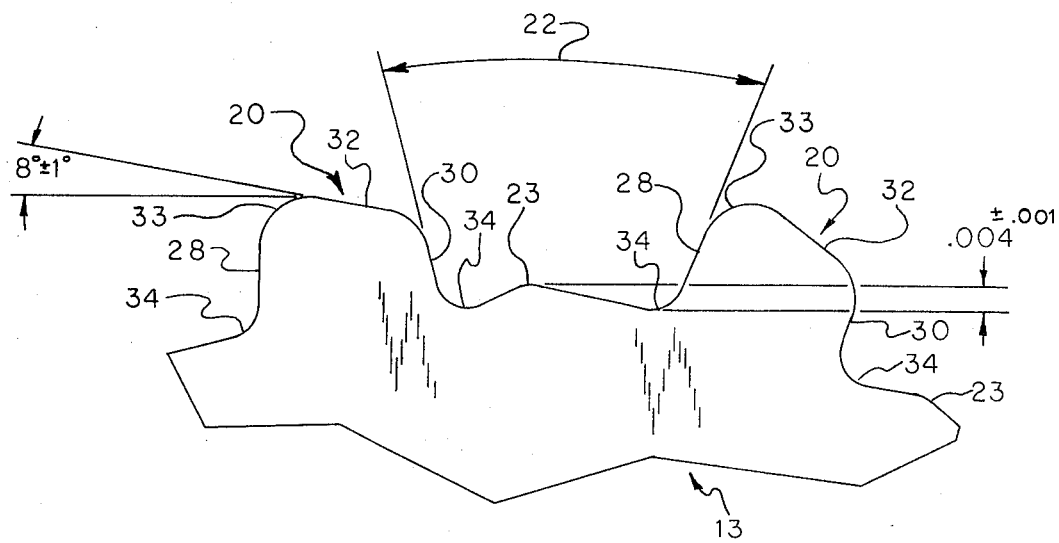
FIG. 2 is an enlarged view that diagrammatically illustrates the contour of a segment of a pulley according to the invention.

In FIG. 2, there is shown a segment 13 of pulley 12 specifically illustrating the tooth contour of two identical adjacent teeth 20. Although only two teeth are shown, numbered, and described, it is to be presumed that like spaced teeth having identical contours are disposed in like fashion along the entire periphery of pulley 12. The teeth of pulley 12 extend transverse of the pulley width to define a valley 22 therebetween.

The term "valley" as it pertains to this disclosure is defined as the included opening or space between a driving face 28 of one tooth of pulley 12 and a trailing face 30 of an adjacent tooth.

Figure 3:
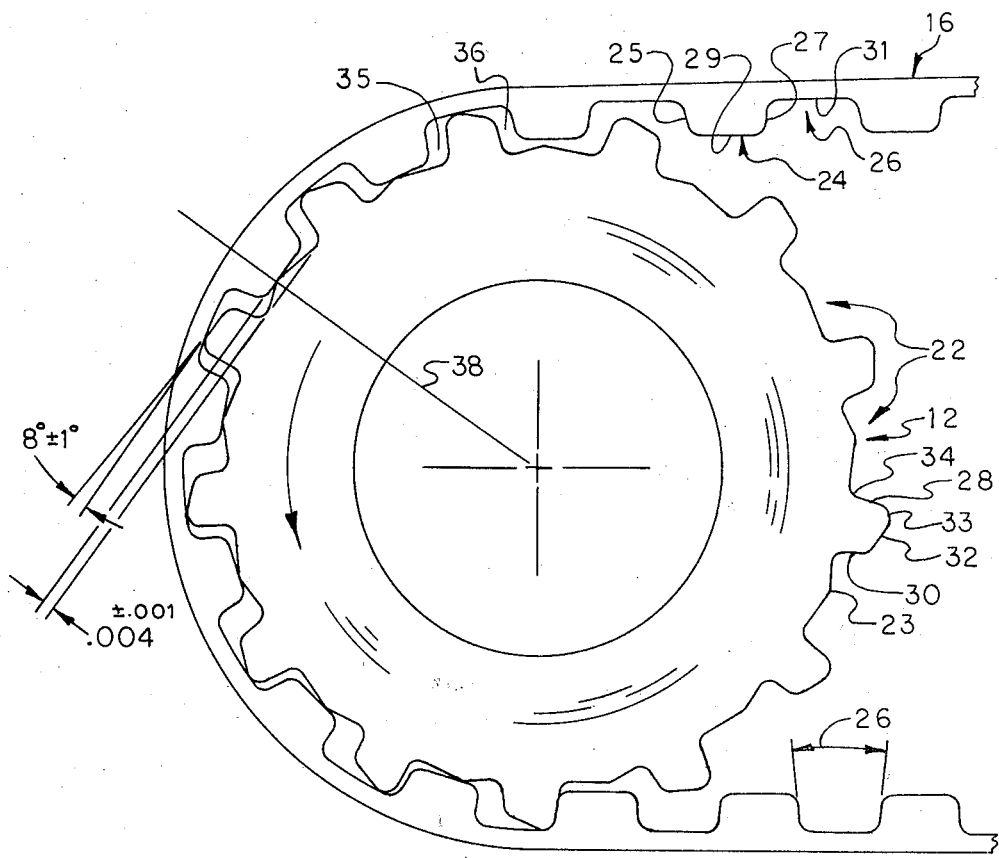
FIG. 3 is an enlarged view illustrating the cooperating relationship of a power transmission belt with the pulley, according to the invention.

There is fully shown in FIG. 3, pulley 12 in mesh with drive belt 16. Belt 16 is equal in width to the width of pulley 12 and includes a plurality of identical teeth 24 that are equally spaced along its entire length. Belt teeth 24 transverse of its width to define a valley 26 therebetween. Belt teeth 24 are defined by a driving face 25, a trailing face 27, and a tooth crest 29 therebetween.

Referring back to FIG. 2 where pulley teeth 20 are defined by driving face 28, trailing face 30, and a connecting crest 32 therebetween. Tooth faces 28 and 30 depend from tooth crest 32 and terminate at a base 34 of valley 22. Tooth crest 32 includes an apex 33 disposed proximate driving face 28 and depends from apex 33 to trailing face 30. In the disclosed embodiment, the included angle defined by driving face 28 and tooth crest 32 is an acute angle.

Driving face 28 depends from tooth crest apex 33 to valley base 34 at an angle corresponding to the angle of driving face 25 of belt 16. The term "valley base", as it relates to this disclosure, is defined as the lowermost surface of valley 22 in relation to the tooth apexes. Tooth crest 32 depends from tooth crest apex 33 at an angle of 8° to terminate in trailing face 30 as shown in FIG. 3. This angular relationship has been found to provide excellent noise reduction although other angular configurations also reduce noise and may be employed. Trailing face 30 depends from tooth crest 32 to alley base 34.

Although in the preferred embodiment all tooth apexes and valley bases are defined by radii, it is to be understood that the radii are for purposes of longer belt life and do not necessarily constitute a significant part of the invention.

As clearly illustrated in FIG. 3, tooth valley 22 of pulley 12 is of a greater dimension than the overall length of any tooth 24 of belt 16. The length of a belt tooth as it relates to this disclosure is defined as the included dimension between the driving and trailing faces of any belt tooth.

Further illustrated in FIG. 3, belt tooth valley 26 is clearly shown to be greater than the overall length of any tooth of pulley 12. The length of pulley tooth 20 is defined by the included dimension between the driving and trailing faces of the pulley tooth.

Tooth valley 22 is contoured to define an apex 23 that is centrally disposed between the apexes of adjacent teeth 20. The height of valley apex 23 may be varied according to conditions such as the rotative speed of the pulley, the load which it will operate, the pulley material, etc. However, it is preferred in the present embodiment, that the valley apex 23 be positioned above valley base 34 at a minimum height. In the preferred embodiment, a pulley having 13 teeth with an outside diameter of 0.319 has been selected and modified to meet the requirements of the present invention. The valley apex 23 of the selected pulley is positioned 0.004 above valley base 34. While a specific height of valley apex 23 has been selected by the applicant in that it provides excellent noise reduction other height variations also reduce noise and may be employed.

The angle of tooth crest 32 and the height of valley apex 23 are measured distances which are relative to a base line 38 that extends from the center of the pulley through the center of valley apex 23 which is clearly illustrated in FIG. 3.

It can therefore be seen from the foregoing that at no time will teeth 24 of belt 16 contact any trailing face 30 of pulley 12. Furthermore, the radial distances between the driving faces of adjacent teeth of pulley 12 or any other radial distances between the driving faces of adjacent teeth is greater than the radial distance between the driving faces of any two adjacent teeth of belt 16. This is clearly shown in FIG. 3 as clearance space 35 and clearance space 36, a relationship that exists for all in-mesh belt and pulley teeth of the instant invention. Hence, only the driving face of only one tooth of pulley 12 will be in driving contact with only one driving face of one tooth of belt 16 at any and all times. All teeth of belt 16 will contact the valleys 22 of pulley 12 in a roll free engagement and disengagement about valley apexes 23.

A roll free engagement and disengagement between the teeth of pulley 12 and the teeth of belt 16 is obtained in the following manner. Each tooth crest of belt 16 contacts pulley 12 at valley apex 23 and each tooth crest of belt 16 being thereafter supported by valley apex 23, rolls relative to apex 23 during its radial movement along the engaging periphery of pulley 12.

This roll free engagement and disengagement is desirable in that it results in a quieter operation when the belt engages the pulley.

In operation, teeth 24 of belt 16 are in minimum peripheral contact with teeth 20 of pulley 12 and are continuously out of contact with the driving and trailing faces of the belt teeth except for the crest 29 of belt teeth 24 which contacts the pulley valley apexes 23 and the tooth base 31 which contacts the pulley tooth crest apex 33. Therefore, as pulley 12 revolves, it drives belt 16 by means of the last in-mesh tooth of pulley 12 engaging the last in-mesh tooth of belt 16. All preceeding teeth of belt 16 are disengaged from the preceeding teeth of pulley 12, except for the crests 29 of belt teeth 24 being in a roll free contact with each and every valley apex 23 of pulley 12, and the bases 31 which contact each and every tooth crest apex 33 of pulley 12. Under load conditions belt 16 is in minimum peripheral toothed engagement with pulley 12 and as the next engaging tooth of belt 16 approaches pulley 12, the belt tooth enters into the center of valley 22 thereby providing quiet initial engagement. Belt tooth crest 29 contacts valley apex 23 without deformation thereof. Therefore, belt tooth crest 29 and tooth base 31 alternately rolls into and out of engagement with pulley valley apex 23 and pulley tooth crest 32 respectively. In this manner, the drive contact between belt 16 and pulley 12 is minimum and the initial contact noise substantially reduced.

As belt 16 continues its path along the periphery of pulley 12, belt tooth base 31 contacts pulley tooth apex 33, but the tooth faces of belt 16 do not make contact with the pulley tooth faces at this time. As belt 16 continues further along its path around pulley 12, the clearance between belt tooth driving faces 25 and pulley driving faces 28 progressively decreases until belt tooth driving face 25 of the last engaging belt tooth engages pulley tooth driving face 28 of the last engaging pulley tooth at which time belt 16 is driven. As base 31 of belt tooth 24 contacts pulley tooth 20 at tooth crest apex 33, it does not contact the remaining portion of tooth crest 32. The clearance between belt base 31 and pulley tooth crest 32 is maintained along the entire peripheral engagement of belt 16 and pulley 12. The minimum tooth contact between pulley 12 and belt 16 results in a substantially quiet engagement between the teeth compared to the slopping noise caused by the contact of the flat teeth of a positive drive power transmission belt with the flat crest of the teeth of a standard toothed pulley.

The combination of the contoured pulley tooth crest resulting in a minimum contact with the belt; the raised apex in the valley between the pulley teeth which further minimizes the contact between the pulley and belt; and the central disposition of the apex between the tooth crest apexes rather than the teeth themselves to give more uniform support to the belt, provides a quieter contact between the pulley and the belt and results in a quieter running power transmission drive system.

While the foregoing description has shown and described the fundamental novel features as applied to a preferred embodiment, it will be understood by those skilled in the art that modification embodied in various forms may be made without departing from the spirit and scope of the invention.

What is claimed is:

1. A toothed pulley and a belt to be driven thereby for transmitting power, the combination comprising:
   means to provide minimal contact between the teeth of the toothed pulley and the belt and
   means to provide minimal contact between the tooth valleys of the pulley and the teeth of the belt.

2. A toothed pulley and a belt as defined in claim 1 wherein said tooth contact means includes the teeth of the toothed pulley and belt formed to provide minimal contact therebetween.

3. A pulley as defined in claim 1 wherein said minimal tooth contact is a driving engagement of less than all the teeth of the toothed pulley and belt.

4. A toothed pulley and a belt as defined in claim 1 wherein said minimal tooth contact means includes a single tooth engagement between the toothed pulley and the belt.

5. A toothed pulley and a belt as defined in claim 1 wherein the toothed pulley includes teeth having a driving face and a trailing face and said belt includes a plurality of teeth corresponding to said pulley teeth and said single tooth engagement is defined by the engagement of said driving face of said single pulley tooth and the driven face of said corresponding belt tooth.

6. A toothed pulley as defined in claim 5 wherein said minimal valley contact means of the toothed pulley includes an apex in the tooth valleys of the pulley.

7. A toothed pulley as defined in claim 5 wherein said minimal tooth contact means of the toothed pulley includes an apex on said pulley teeth for providing minimal tooth contact between the pulley and the belt.

8. A toothed pulley and a belt as defined in claim 7 wherein said pulley tooth apex is proximate said pulley tooth driving face.

9. A toothed pulley and a belt as defined in claim 5 wherein the toothed pulley includes an apex between the teeth on the toothed pulley and an apex on the teeth of the toothed pulley for providing minimal contact between the pulley and the belt.

10. A toothed pulley as defined in claim 9 wherein said apex in the tooth valleys is centrally disposed between said apexes on the teeth of the toothed pulley.

11. A toothed pulley and a belt as defined in claim 1 wherein said minimal valley contact means includes an apex between the teeth on the toothed pulley for for providing minimal contact between the pulley and the belt.

12. A toothed pulley and a belt as defined in claim 1 wherein said minimal tooth contact means includes an on the teeth of the toothed pulley for providing minimal contact between the pulley and the belt.

13. A toothed pulley and a blet as defined in claim 1 wherein said minimal contact means includes an apex in the tooth valleys on the toothed pulley and an apex on the teeth of the toothed pulley.

14. A toothed pulley and a belt as defined in claim 1 wherein said minimal tooth contact means includes the pulley teeth having a driving face, a trailing face and a tooth crest therebetween, said tooth crest includes an apex proximate said driving face and decreases in height from said apex to said trailing face.

15. A pulley as defined in claim 14 wherein said tooth crest and said driving face define an acute angle.

16. A pulley and a belt assembly for transmitting power, the combination comprising:
the pulley having a plurality of teeth equally spaced along the periphery thereof including an apex between teeth; and
the belt in mesh with the pulley and having a plurality of teeth equally spaced thereon a distance slightly less than the distance of the spaced pulley teeth such that less than all the pulley teeth are in driving engagements with the belt teeth.

17. A pulley and belt assembly as defined in claim 16 wherein the pulley includes as apex on the teeth thereof engaged by the belt.

18. A toothed pulley and a belt as defined in claim 16 wherein said pulley teeth include a driving face, a trailing face and a tooth crest therebetween, said tooth crest includes an apex proximate said driving face and decreases in height from said apex to said trailing face.

19. A pulley as defined in claim 18 wherein said tooth crest and said driving face define an acute angle.

20. A pulley and belt assembly as defined in claim 18 wherein said pulley tooth apex is proximate and pulley tooth driving face.

21. A pulley and belt assembly as defined in claim 16 wherein the pulley includes an apex between the teeth and an apex on the teeth thereof engaged by the belt.

22. A pulley and belt assembly as defined in claim 21 wherein said apex between the teeth is centrally disposed between said apexes on the teeth of the pulley for supporting the belt.

23. An improved electric typewriter having a motor and a shaft for operating a typewriter function, the improvement comprising:

a coupling between the motor and the shaft incuding a toothed pulley and a belt driven by the toothed pulley; and;
said tooth pulley having means including an apex between the teeth to provide minimal contact between the pulley and the belt for minimizing the generation, of said audible noise.

24. An electric typewriter as defined in claim 23 wherein said minimal contact means further includes a driving engagement of less than all the teeth of said toothed pulley and said belt.

25. An electric typewriter as defined in claim 23 wherein said minimal contact means includes a single tooth driving engagement between said toothed pulley and said belt.

26. An electric typewriter as defined in claim 25 wherein said minimal contact means includes a single tooth engagement between said toothed pulley and said belt.

27. An electric typewriter as defined in claim 26 wherein said toothed pulley includes teeth having a driving face and a trailing face and a tooth crest therebetween, said tooth crest includes an apex proximate said driving face and said belt includes a plurality of teeth corresponding to said pulley teeth and said single tooth engagement is defined by said driving face of said single tooth and said corresponding belt tooth.

28. An electric typewriter as defined in claim 27 wherein said pulley tooth apex is proximate said pulley tooth driving face.

29. An electric typewriter as defined in claim 28 wherein said apex between the teeth is centrally disposed between said apexes on the teeth of the toothed pulley.

30. An electric typewriter as defined in claim 27 wherein said pulley tooth crest and said tooth driving face define an acute angle.

31. An electric typewriter as defined in claim 23 wherein said minimal contact means includes an apex on the teeth of the toothed pulley.

32. An electric typewriter as defined in claim 23 wherein said minimal contact means includes an apex between the teeth on the toothed pulley and an apex on the teeth of the toothed pulley.

33. A pulley for transmitting power comprising:
a plurality of teeth spaced along the periphery thereof; and
an apex between the teeth.

34. A pulley as defined in claim 23 wherein said teeth have an apex thereon.

35. A pulley as defined in claim 34 wherein said tooth apex is proximate a pulley tooth face.

36. A pulley as defined in claim 35 wherein said pulley tooth face is a driving face.

* * * * *